United States Patent [19]

Pace

[11] Patent Number: 4,678,269
[45] Date of Patent: Jul. 7, 1987

[54] CONCENTRIC LIGHT SOURCE TO FIBER COUPLING SYSTEM

[76] Inventor: Nevlin C. Pace, P.O. Box 41, Bailey, Miss. 39320

[21] Appl. No.: 807,329

[22] Filed: Dec. 10, 1985

[51] Int. Cl.$^4$ .............................................. G02B 6/42
[52] U.S. Cl. ................................. 350/96.18; 250/552; 350/96.20; 357/17
[58] Field of Search ............... 350/96.15, 96.17, 96.18, 350/96.20, 96.21; 250/227, 552; 357/17, 19, 30, 74

[56] References Cited

U.S. PATENT DOCUMENTS

| | | | |
|---|---|---|---|
| 3,773,289 | 11/1973 | Gloge | 250/211 J |
| 4,021,099 | 5/1977 | Kawasaki et al. | 350/96.21 |
| 4,252,403 | 2/1981 | Salisbury | 350/96.15 |
| 4,279,465 | 7/1981 | Vojvodich | 350/96.20 |
| 4,412,720 | 11/1983 | Costa | 350/96.18 |

FOREIGN PATENT DOCUMENTS

56-81809  7/1981  Japan .................. 350/96.15

*Primary Examiner*—John Lee
*Attorney, Agent, or Firm*—Laurence R. Brown

[57] ABSTRACT

Increased light energy is introduced into the end of a fiber in a fiber optic light transmission system by this invention, thus providing further distances between repeater stations along long transmission paths and producing higher signal energy levels along the transmission path. This is achieved by presenting input modulated light from a ring shaped light emission pattern concentrically configured about a fiber near an end for receiving input light signals, and processing the modulated light from the ring pattern with an optical system including a parabolic reflector receiving the modulated light to direct and focus it upon the end of the fiber for transmission along the fiber. Light emitting semiconductors with ring shaped emission junctions about a central duct for passing a fiber provide more energy than conventional shapes in a manner that may be processed in a simple low loss optical system.

3 Claims, 5 Drawing Figures

CONCENTRIC LIGHT SOURCE TO FIBER COUPLING SYSTEM

TECHNICAL FIELD

This invention relates to fiber optic light transmission systems and more particularly, it relates to fiber light input equipment useful for repeater stations along a fiber transmission line.

BACKGROUND ART

Fiber optic light transmission lines are subject to such amplitude losses of modulated light signals that repeater stations are required for reamplifying the light signals.

In such repeater stations, as well as in initial light input stations, the amount of light input is significantly limited in the prior art because of the limitations of size in light genetration sources and because of the nature of optical input systems to relay the light into the fiber. For example, the point source (LED) light emitting diode modulating systems conventionally used are significantly limited in light amplitude by the heat generated. Similar point source laser modulation systems are so limited.

Because of the light input power limitations of the light modulators, typically ten milliwatts, and optical-to-fiber coupling systems in the prior art therefor, the distance between repeaters in an optical fiber transmission system is quite limited.

It is thus an objective of this invention to provide improved higher power light modulators and corresponding optical fiber coupling systems resulting in improved repeaters that will permit longer distances between repeaters in fiber optic light transmission lines.

DISCLOSURE OF THE INVENTION

This invention therefore converts light in a concentric ring configuration by a corresponding optical system into the end of a fiber thereby to produce significantly more light power amplitude into the fiber. The optical system collimates modulated light from the concentric source in a direction parallel to the fiber axis and concentric therewith into a parabolic reflector which in turn focuses the modulated light into the end of the fiber.

The light source may typically be a concentrically ring emitting LED or diode laser or a corresponding laser of the heterostructure type, or alternately a plurality of edge emitting LED's or lasers arranged in a ring, in each case providing the emission of modulated light in a concentric ring configuration.

With the higher power light input to the fiber from this configuration, fiber transmission systems can provide longer distances between repeaters.

THE PREFERRED EMBODIMENTS

Figure 1:
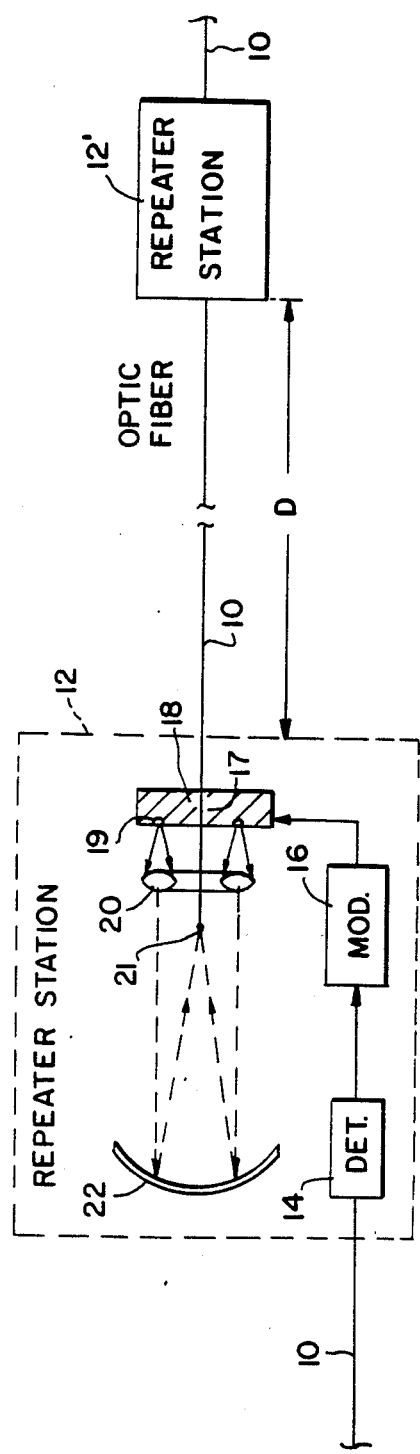
FIG. 1 is a schematic view of the optical light-to-fiber coupling system afforded by this invention.

As may be seen in FIG. 1, a fiber optic 10 transmission line needs periodically located repeater stations 12 for restoring light energy lost in the transmitting fiber in transit. The present invention is ideally suited for use in the repeater stations to introduce greater amplitudes of light energy, and thus permitting increases in the distances D between repeater stations along a fiber optic light transmission line.

In a repeater embodiment as shown in FIG. 1, a low amplitude light signal is detected as detector 14 from the end or from a joint of a fiber 10 in the fiber optic transmission system. This detected signal operates modulator 16 which drives the light source 18 to produce the light signal with increased light energy amplitude to enter a signal into the fiber 10 transmission line at the end 21 of the fiber after processing by the accompanying optical system with enough energy to be transmitted the distance D to the next reception or repeater station 12'.

Figure 2:
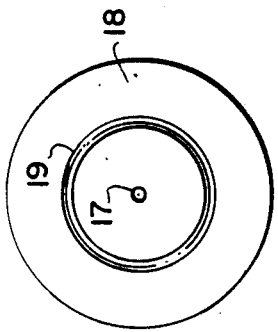
FIG. 2 is a plan view of an edge emitting PN junction LED light source with a concentric configuration as afforded by this invention.

The light source 18 of FIGS. 1 and 2 as provided by this invention comprises means for presenting a ring shaped light emission pattern from a ring 19, which in this case is the light emitting edge 19 of a PN junction light emitting diode LED. Since this edge is concentrically configured about the fiber 10, there is a duct 17 extending through the light source body, which is oriented with the light emission ring positioned in a plane perpendicular to the axis of fiber 10. Alternate embodiments of light sources will be later described, but in general the objective is to increase the light energy available for entering the fiber, and a junction semiconductor of the type described produces an efficient light source for this purpose.

The ring 19 could be an array of point emission type LED or laser devices modulated in parallel, which in a similar manner would substantially increase light energy available from a conventional LED or laser. Note that the amount of light energy available is limited by heat and the typical ten milliwatt energy of a conventional LED or laser is greatly increased by the concentric ring configuration about the fiber to thereby permit more signal energy amplitude to enter the fiber and thus to substantially increase the distance D between repeater stations 12, which are required because of inherent signal energy attenuation along the transmission line. Of course, greater signal energy levels are useful in the fiber optic transmission medium for other purposes as well.

This concentric ring light emission configuration not only because of the larger junction area allows significantly greater light energy but additionally permits a simplified optical system to concentrate substantially all the available modulated signal energy and enter it into the fiber 10 optical transmission line system. Thus, light emissions from the ring 19 light source are collimated by the toroidal collimating lens 20 and passed to parabolic reflector lens 22 to be focussed thereby into the end 21 of the fiber 10. The focal length of the parabolic lens 22 is long enough to direct the light energy into the fiber at an angle such that the energy is transmitted in substantially its entirety along the fiber optic transmission path.

Figure 3:
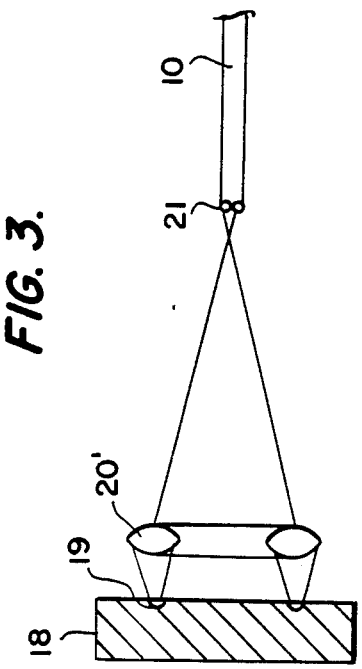
FIG. 3 is a sketch of an alternative optical system embodiment of the invention.

The collimating lens 20 efficiently collects and concentrates substantially the entire light signal energy available from light source 18. An alternative construction would be to use the collimator lens 20 to directly focus the light energy into the end of a fiber, in which embodiment, sketched as FIG. 3, there need not be a duct 17 in the light source to position it over the fiber. The embodiment of FIG. 1 is preferred, however, because it may be made in a self-aligning form which uses the fiber in alignment and need only be located axially along the fiber to adjust the focal length of the parabolic lens 22 with respect to the end of the fiber.

It may be appreciated that this light source and optical system configuration is significantly less complex and expensive than prior art systems for processing light signal energy from a light source into the end of a fiber, such as represented in U.S. Pat. No. 4,412,720 to B. Costa, Nov. 1, 1983, for example.

If concentric layer fibers such as shown in U.S. Pat. No. 4,252,403 to G. Salisbury, Feb. 24, 1981 are employed, the concentric light emission configuration and optical system of this invention permits the improved combinational interaction of being able to segregate various modulated light signals into different concentric fiber regions.

A ring shaped junction semiconductor conductor of the nature shown in U.S. Pat. No. 3,773,289 to D. Gloge, Nov. 20, 1973 could be employed with such concentric region fibers, and is representative of the state of the art of semiconductors having ring shaped junctions.

Figure 4:
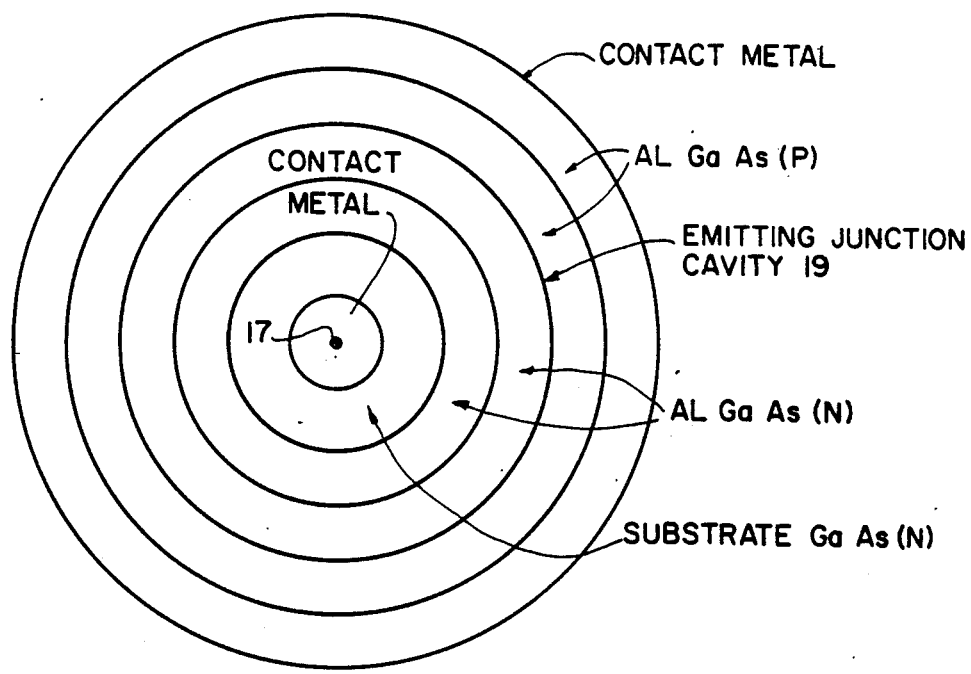
FIG. 4 is a plan view of a concentric edge emitting heterojunction type laser configuration of the concentric light emitting device afforded by this invention.
Figure 5:
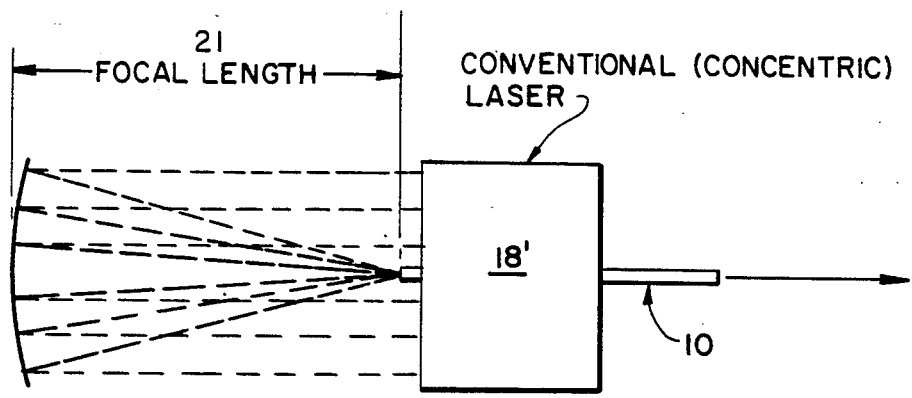
FIG. 5 is a schematic view of a laser embodiment of the concentric light processing optical system afforded by this invention.

As shown in FIG. 4, the light source may be a concentric edge emitting heterojunction type laser semiconductor constructed as identified by the legends. This embodiment of a conventional laser having a light emitting surface or a concentric ring cavity may be employed as indicated in the system view of FIG. 5, wherein the collimator lens is not necessary and the single parabolic reflector lens focusses the light energy into the optical fiber in the manner hereinbefore described. The optical embodiment of FIG. 3 may also be employed.

I claim:

1. A fiber optic light transmission system comprising in combination, a fiber for transmitting light in said system having a fiber joint adapted to receive modulated light thereinto for transmission axially along the fiber, a source of modulated light for transmission through the fiber presenting in a ring shaped light emission pattern concentrically configured about the axis of said fiber and directing the light concentrically toward the fiber joint, said source of modulated light having an edge emitting PN junction diode, an optical system for receiving the concentrically directed light comprising a toroidal collimating lens concentrically located about the fiber in a position near an end of said fiber receiving the concentrically configured light from said source, and a parabolic reflector positioned to inject the modulated light into the end of said fiber in a ring shaped pattern at the end of said fiber.

2. The system of claim 1 wherein the light source is a laser device providing a ring type cavity configuration from which emission light energy is focused through said toroidal lens.

3. The system of claim 1 wherein the light source comprises a semiconductor presenting a planar surface with a light emitting junction presenting the light emission pattern having a duct through the semiconductor at substantially the center of said pattern for passing over said fiber.

* * * * *